United States Patent
Yang

(10) Patent No.: US 10,612,864 B2
(45) Date of Patent: *Apr. 7, 2020

(54) THERMAL CONDUCTIVE CYLINDER INSTALLED WITH U-TYPE CORE PIPING AND LOOP PIPING

(71) Applicant: Tai-Her Yang, Taipei (TW)

(72) Inventor: Tai-Her Yang, Taipei (TW)

( * ) Notice: Subject to any disclaimer, the term of this patent is extended or adjusted under 35 U.S.C. 154(b) by 437 days.

This patent is subject to a terminal disclaimer.

(21) Appl. No.: 14/799,226

(22) Filed: Jul. 14, 2015

(65) Prior Publication Data

US 2015/0316296 A1 Nov. 5, 2015

Related U.S. Application Data

(63) Continuation of application No. 12/588,779, filed on Oct. 28, 2009, now Pat. No. 9,103,603.

(51) Int. Cl.
| | |
|---|---|
| *F28D 20/00* | (2006.01) |
| *F24T 10/13* | (2018.01) |
| *F28D 1/047* | (2006.01) |
| *F28F 13/00* | (2006.01) |

(52) U.S. Cl.
CPC .......... *F28D 20/0052* (2013.01); *F24T 10/13* (2018.05); *F28D 1/0472* (2013.01); *F28D 1/0475* (2013.01); *F28F 2013/005* (2013.01); *F28F 2270/00* (2013.01); *F28F 2275/02* (2013.01); *Y02E 10/125* (2013.01); *Y02E 60/142* (2013.01)

(58) Field of Classification Search
CPC .. F28D 20/0052; F28D 1/0475; F28D 1/0472; F24J 3/082; F24J 3/083; F24J 3/08; Y02E 10/125; Y02E 10/12; Y02E 10/18; Y02E 10/142; F28F 2275/02; F28F 2270/00; F24T 10/15; F24T 10/17; F24T 10/13
See application file for complete search history.

(56) References Cited

U.S. PATENT DOCUMENTS

| | | |
|---|---|---|
| 2,844,464 A | 12/1954 | Lawton et al. |
| 3,609,980 A | 10/1971 | Bowers |
| 4,452,303 A | 6/1984 | Bontje et al. |
| 5,477,914 A | 12/1995 | Rawlings |
| 5,561,985 A | 10/1996 | Cochran |

(Continued)

FOREIGN PATENT DOCUMENTS

| | | | |
|---|---|---|---|
| EP | 0582118 A1 * | 2/1994 | ............. E02D 27/12 |
| GB | 2058334 A | 9/1979 | |

(Continued)

*Primary Examiner* — Tho V Duong
(74) *Attorney, Agent, or Firm* — Bacon & Thomas, PLLC

(57) ABSTRACT

The present invention relates to a thermal conductive cylinder installed with U-type core piping and loop piping for being installed within natural thermal storage body or artificial thermal storage body; wherein the piping segments of fluid inlet terminal and/or outlet terminal of the U-type core piping and loop piping are directly made of thermal insulating material, or thermal insulating structure is installed between the inlet terminal and the outlet terminal; so as to prevent thermal energy loss between adjacent piping segments on the same side when thermal conductive fluid with temperature difference passing through.

2 Claims, 3 Drawing Sheets

(56) References Cited

U.S. PATENT DOCUMENTS

| | | | |
|---|---|---|---|
| 6,672,371 B1 | 1/2004 | Amerman et al. | |
| 6,932,149 B2 | 8/2005 | Wiggs | |
| 7,080,524 B2 * | 7/2006 | Wiggs | F24J 3/081 |
| | | | 62/260 |
| 7,146,823 B1 * | 12/2006 | Wiggs | F25B 30/06 |
| | | | 62/260 |
| 7,578,140 B1 * | 8/2009 | Wiggs | F25B 30/06 |
| | | | 165/45 |
| 7,856,839 B2 * | 12/2010 | Wiggs | F24J 3/081 |
| | | | 165/45 |
| 2004/0129408 A1 * | 7/2004 | Wiggs | F24J 3/083 |
| | | | 165/45 |
| 2009/0211727 A1 * | 8/2009 | Yin | F24F 5/0046 |
| | | | 165/45 |

FOREIGN PATENT DOCUMENTS

| | | | | |
|---|---|---|---|---|
| GB | 2058334 A * | 4/1981 | | F24J 3/083 |
| JP | 2001174073 A * | 6/2001 | | |
| JP | 2003302108 A * | 10/2003 | | F24J 3/083 |

* cited by examiner

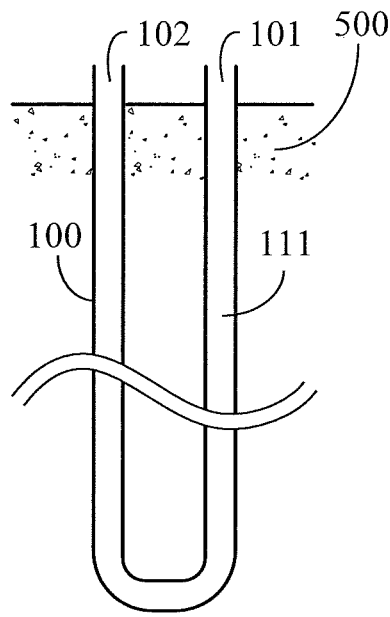
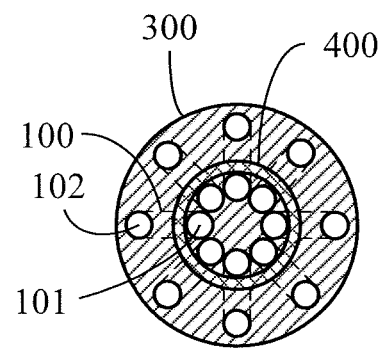
Fig. 1 (Prior Art)
Fig. 3
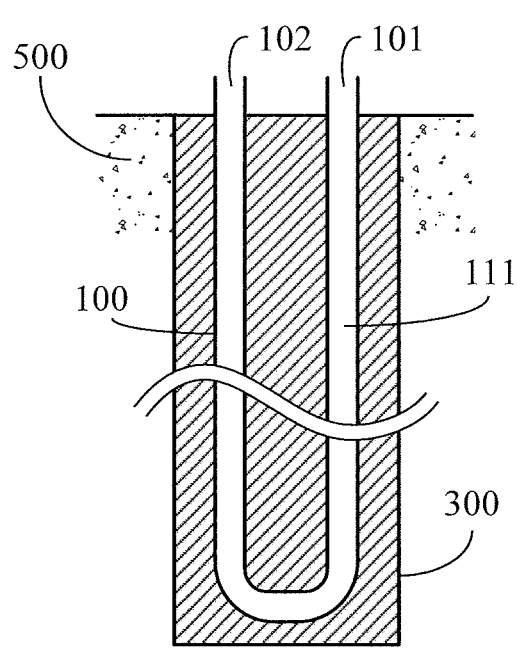
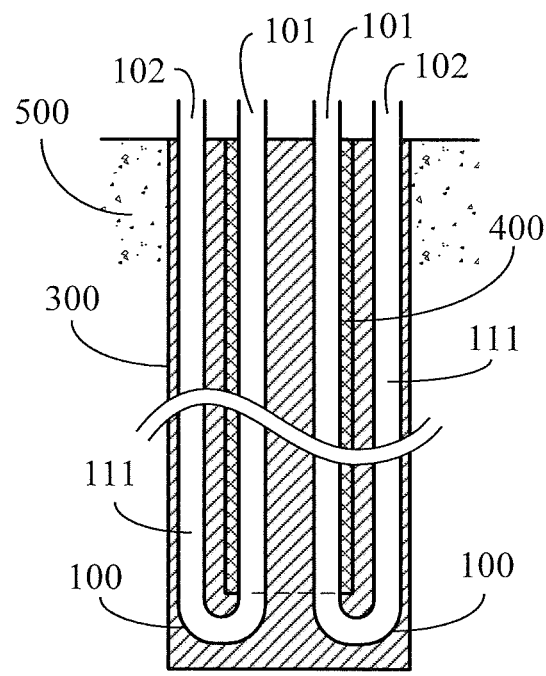
Fig. 2 (Prior Art)
Fig. 4

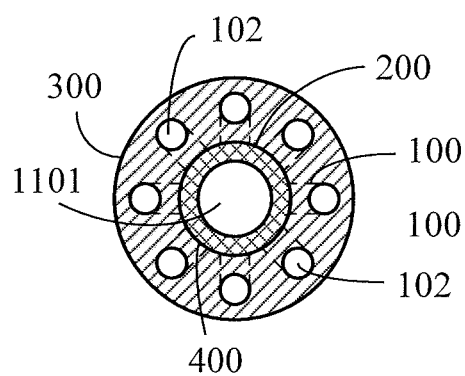
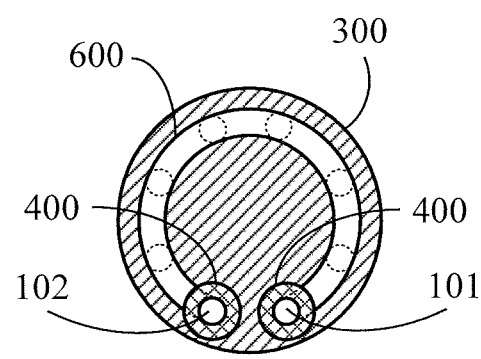
Fig. 5
Fig. 7
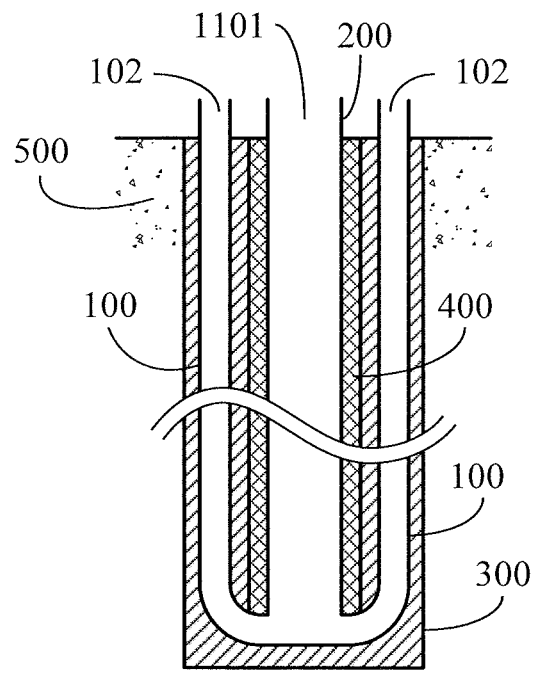
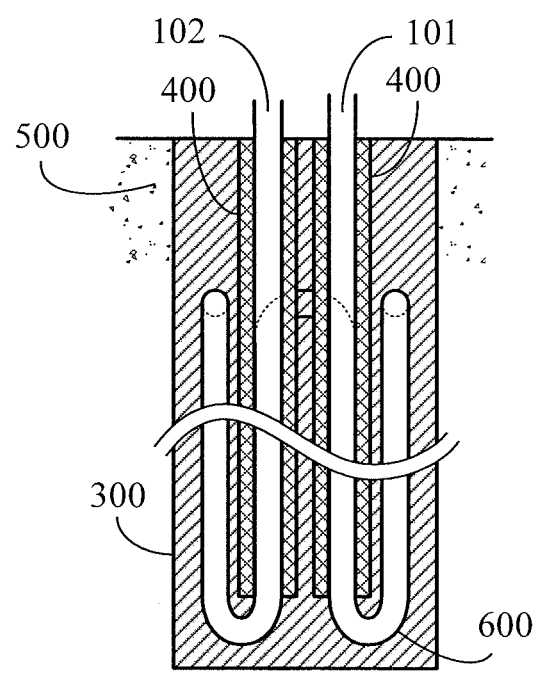
Fig. 6
Fig. 8

THERMAL CONDUCTIVE CYLINDER INSTALLED WITH U-TYPE CORE PIPING AND LOOP PIPING

This application is a continuation of U.S. patent application Ser. No. 12/588,779, filed Oct. 28, 2009, and now allowed.

BACKGROUND OF THE INVENTION (a) Field of the Invention

The present invention relates to a thermal conductive cylinder installed with U-type core piping and loop piping for being installed within the thermal storage body (500) composed of natural thermal storage body, such as shallow surface of the earth, or pool, lake, river, ocean, etc, or artificial objects in solid, or gaseous, or liquid state; wherein the thermal conductive cylinder installed with U-type core piping and loop piping is constructed through that the piping segments of fluid inlet terminal and/or outlet terminal of the U-type core piping and loop piping are directly made of thermal insulating material, or thermal insulating structure is installed between the inlet terminal and the outlet terminal; so as to prevent thermal energy loss because of thermal conduction between adjacent piping segments of inlet terminal and outlet terminal on the same side when thermal conductive fluid with temperature difference passing through.

(b) Description of the Prior Art

Traditionally, thermal energy loss often occurs in U-type piping device of U-type piping heat exchanger, because of thermal conduction by temperature difference between adjacent piping segments of fluid inlet terminal and fluid outlet terminal installed on the same side when fluid with temperature difference passing through.

SUMMARY OF THE INVENTION

The present invention relates to radial U-type pipelines for passing thermal energy through each other, wherein the piping segments of the U-type fluid piping inlet terminal and/or outlet terminal, which are radial U-type pipelines for passing thermal energy through each other, are directly made of thermal insulating material, or thermal insulating structure is installed between the inlet terminal and the outlet terminal; and the above piping system is installed within the thermal conductive cylinder made of thermal conductive material; so as to prevent thermal energy loss because of thermal conduction by temperature difference between adjacent piping segments with temperature difference of inlet terminal and outlet terminal installed on the same side when fluid with temperature difference passing through.

BRIEF DESCRIPTION OF THE DRAWINGS

FIG. 1 shows an embodiment of conventional U-type piping (100) installed within the thermal storage body (500);

FIG. 2 shows an embodiment of conventional U-type piping (100) installed within the columnar thermal conductive body (300), wherein the columnar thermal conductive body (300) is placed within the thermal storage body (500);

FIG. 3 is a structural schematic view showing that two or more radially arranged U-type piping sections are installed within thermal conductive cylinder, and the thermal insulating structure is installed at where close to the peripheral of piping group with same flow direction which concentrates toward axial core, according to the present invention;

FIG. 4 is a section view of FIG. 3;

FIG. 5 is a structural schematic view of an embodiment showing that multiple sets of U-type piping jointly connects to the first fluid inlet and outlet terminal (1101) of the common piping (200) constituted by larger diameter piping installed at the core of the columnar thermal conductive body (300), according to the present invention;

FIG. 6 is a section view of FIG. 5;

FIG. 7 is a schematic view of an embodiment, showing that piping segments of first fluid inlet and outlet terminal (101) and second fluid inlet and outlet terminal (102) in U-type wavy piping (600) are wavily arranged along the axial direction and near the edge of the columnar thermal conductive body (300), according to the present invention;

FIG. 8 is a section view of FIG. 7;

DESCRIPTION OF MAIN COMPONENT SYMBOLS

Figure 9:
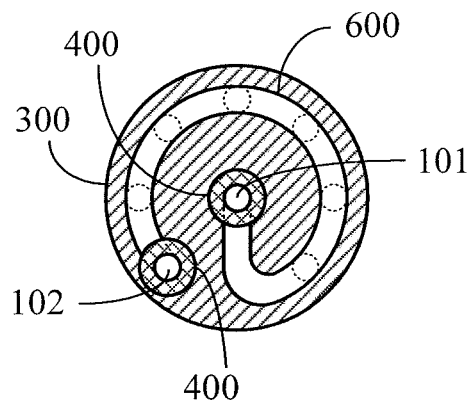
FIG. 9 is a schematic view of an embodiment, showing that the piping segment of the first fluid inlet and outlet terminal (101) in U-type wavy piping (600) is placed near the center of the columnar thermal conductive body (300), the piping segment between the second fluid inlet and outlet terminal (102) is placed near the periphery of the columnar thermal conductive body (300), and the U-type wavy piping (600) between the two piping segments is wavily arranged along the axial direction and near the edge of the columnar thermal conductive body (300), according to the present invention.

100: U-type piping
101: First fluid inlet and outlet terminal
102: Second fluid inlet and outlet terminal
111: Thermal conductive fluid
200: Common piping
300: Columnar thermal conductive body
400: Thermal insulating device
500: Thermal storage body
600: U-type wavy piping
700: Central piping of U-type spiral piping
800: U-type spiral piping
1101: First fluid inlet and outlet terminal

DETAILED DESCRIPTION OF THE PREFERRED EMBODIMENTS

The present invention relates to a thermal conductive cylinder installed with U-type core piping and loop piping for being installed within the thermal storage body (500) composed of natural thermal storage body, such as shallow surface of the earth, or pool, lake, river, ocean, etc, or artificial objects in solid, or gaseous, or liquid state; wherein the thermal conductive cylinder installed with U-type core piping and loop piping is constructed through that the piping segments of fluid inlet terminal and/or outlet terminal of U-type core piping and loop piping are directly made of thermal insulating material, or thermal insulating structure is installed between the inlet terminal and the outlet terminal;

so as to prevent thermal energy loss because of thermal conduction between adjacent piping segments of inlet terminal and outlet terminal on the same side when thermal conductive fluid with temperature difference passing through.

As for the thermal conductive cylinder installed with U-type core piping and loop piping of the present invention, each of the U-type piping (100) is used for passing through one or more following thermal conductive fluid (111), including for passing through:

1) liquid state fluid;
2) gaseous state fluid;
3) liquid to gaseous state fluid; and
4) gaseous to liquid state fluid.

Traditionally, thermal energy loss often occurs in U-type piping device of U-type piping heat exchanger, because of thermal conduction by temperature difference between adjacent piping segments of fluid inlet terminal and fluid outlet terminal installed on the same side when fluid with temperature difference passing through, which is illustrated by examples as followings:

FIG. 1 shows an embodiment of conventional U-type piping (100) installed within the thermal storage body (500). When the thermal conductive fluid (111) passing through the piping segment of the first fluid inlet and outlet terminal (101) and the adjacent piping segment of the second fluid inlet and outlet terminal (102) respectively installed on the same side of the U-type piping (100) are in temperature difference, the two piping segments will produce thermal conduction and therefore result in thermal energy loss.

FIG. 2 shows an embodiment of conventional U-type piping (100) installed within the columnar thermal conductive body (300), wherein the columnar thermal conductive body (300) is placed within the thermal storage body (500).

When the columnar thermal conductive body (300) is installed at the thermal conductive cylinder installed with U-type core piping and loop piping of the thermal storage body (500) composed of natural thermal storage body, such as shallow surface of the earth, or pool, lake, river, ocean, etc, or artificial objects in solid, or gaseous, or liquid state, and the thermal conductive fluid (111) with temperature difference passes through the first fluid inlet and outlet terminal (101) and the second fluid inlet and outlet terminal (102) of the U-type piping, there will be thermal energy loss, because of thermal conduction between adjacent piping segments of the first fluid inlet and outlet terminal (101) and the second fluid inlet and outlet terminal (102) installed on the same side.

The present invention relates to a thermal conductive cylinder installed with U-type core piping and loop piping for being installed within the thermal storage body (500) composed of natural thermal storage body, such as shallow surface of the earth, or pool, lake, river, ocean, etc, or artificial objects in solid, or gaseous, or liquid state; wherein the thermal conductive cylinder installed with U-type core piping and loop piping is constructed through that the piping segments of the U-type fluid piping inlet terminal and/or outlet terminal, which are radial U-type pipelines for passing thermal energy through each other, are directly made of thermal insulating material, or thermal insulating structure is installed between the inlet terminal and the outlet terminal; so as to prevent thermal energy loss because of thermal conduction between adjacent piping segments of inlet terminal and outlet terminal on the same side when thermal conductive fluid with temperature difference passing through.

FIG. 3 is a structural schematic view showing that two or more radially arranged U-type piping sections are installed within thermal conductive cylinder, and the thermal insulating structure is installed at where close to the peripheral of piping group with same flow direction which concentrates toward axial core, according to the present invention.

FIG. 4 is a section view of FIG. 3.

As shown in FIG. 3 and FIG. 4, the main components are as followings:

U-type piping (100): made of U-type tubular body for the thermal conductive fluid (111) passing through, wherein the U-type piping (100) is used for being installed within the columnar thermal conductive body (300) composed of solid state or colloidal object; each of the U-type piping (100) has the first fluid inlet and outlet terminal (101) and the second fluid inlet and outlet terminal (102), the piping segments near the first fluid inlet and outlet terminal (101) are concentrated adjacent installed at the core of the columnar thermal conductive body (300), and the piping segments near the second fluid inlet and outlet terminal (102) are radially arranged along the axial direction and near the edge of the columnar thermal conductive body (300);

Columnar thermal conductive body (300): made of thermal conductive material, wherein the columnar thermal conductive body (300) has columnar structure with various geometric shape sections, such as circle, oval, square, rectangular, or star, for coating the U-type piping (100) and the thermal insulating device (400); and Thermal insulating device (400): related to thermal insulating structure constituted by the followings with thermal insulating effects, such as solid, flexible body, or foam, or enveloped colloid, gas, or liquid, or vacuum structure, for being placed between the piping segments near the first fluid inlet and outlet terminal (101) of each of the U-type piping (100), which are concentrated adjacent installed at the axial core of the columnar thermal conductive body (300), and the piping segments near the second fluid inlet and outlet terminal (102) of each of the U-type piping, or for being substituted by the piping segments near the first fluid inlet and outlet terminal (101) directly made of thermal insulating material or enveloped by thermal insulating material; by way of the above thermal insulating structure, for substantially reducing thermal energy loss caused by thermal conduction between adjacent piping segments of the first fluid inlet and outlet terminal (101) and the second fluid inlet and outlet terminal (102) on the same side of the U-type piping (100).

As for the thermal conductive cylinder installed with U-type core piping and loop piping of the present invention, it further can have multiple sets of U-type piping jointly connected to the first fluid inlet and outlet terminal (1101) of the common piping (200) constituted by larger diameter piping installed at the axial core of the columnar thermal conductive body (300), and be installed with the second fluid inlet and outlet terminal (102) in radially arrangement along the axial direction of the columnar thermal conductive body (300).

FIG. 5 is a structural schematic view of an embodiment showing that multiple sets of U-type piping jointly connects to the first fluid inlet and outlet terminal (1101) of the common piping (200), which is constituted by larger diameter piping and installed at the core of the columnar thermal conductive body (300), according to the present invention.

FIG. 6 is a section view of FIG. 5.

As shown in FIG. 5 and FIG. 6, it is mainly constituted by at least two U-type piping (100) for the thermal conductive fluid (111) passing through, wherein each of the U-type piping (100) is used for being installed within the columnar thermal conductive body (300) composed of solid state or colloidal object; each of the U-type piping (100) is jointly connected to the first fluid inlet and outlet terminal (1101) of common piping (200) which is constituted by larger diameter piping and installed at the axial core of the columnar thermal conductive body (300), and is installed with the second fluid inlet and outlet terminal (102) and piping segments radially arranged along the axial direction of the columnar thermal conductive body (300); the first fluid inlet and outlet terminal (1101) of common piping (200) is placed at the axial core of the columnar thermal conductive body (300), and is further installed with the thermal insulating device (400) between the piping segments near the second fluid inlet and outlet terminal (102) of each U-type piping (100), and the piping segments near the second fluid inlet and outlet terminal (102) of each U-type piping (100) are radially arranged along the axial direction and near the edge of the columnar thermal conductive body (300); and Columnar thermal conductive body (300): made of thermal conductive material, wherein the columnar thermal conductive body (300) has columnar structure with various geometric shape sections, such as circle, oval, square, rectangular, or star, for coating the U-type piping (100) and the thermal insulating device (400); and Thermal insulating device (400): related to thermal insulating structure constituted by the followings with thermal insulating effects, such as solid, flexible body, or foam, or enveloped colloid, gas, or liquid, or vacuum structure, for being placed between the piping segments near the second fluid inlet and outlet terminal (102) of the U-type piping (100) and the piping segments near the first fluid inlet and outlet terminal (1101) of the common piping (200), or for being substituted by the piping segments near the first fluid inlet and outlet terminal (101) directly made of thermal insulating material or enveloped by thermal insulating material; by way of the above structure, for reducing thermal energy loss caused by thermal conduction between the piping segments of the first fluid inlet and outlet terminal (1101) of the common piping (200) and the second fluid inlet and outlet terminal (102).

FIG. 7 is a schematic view of an embodiment, showing that piping segments of first fluid inlet and outlet terminal (101) and second fluid inlet and outlet terminal (102) in U-type wavy piping (600) are wavily arranged along the axial direction and near the edge of the columnar thermal conductive body (300), according to the present invention.

FIG. 8 is a section view of FIG. 7.

As shown in FIG. 7 and FIG. 8, the main components are as followings:

U-type wavy piping (600): made of U-type wavy pipe body for the thermal conductive fluid (111) passing through, wherein the U-type wavy piping (600) is used for being installed within the columnar thermal conductive body (300) composed of solid state or colloidal object; the feature is that the U-type wavy piping (600) is wavily placed around the axial direction and near the edge of the columnar thermal conductive body (300) with upper and lower wavy bending, and the both ends of the U-type wavy piping (600) have the first fluid inlet and outlet terminal (101) and the second fluid inlet and outlet terminal (102) which are interlinked;

Columnar thermal conductive body (300): made of thermal conductive material, wherein the columnar thermal conductive body (300) has columnar structure with various geometric shape sections, such as circle, oval, square, rectangular, or star, for coating the U-type wavy piping (600) and the thermal insulating device (400); and Thermal insulating device (400): related to thermal insulating structure constituted by the followings with thermal insulating effects, such as solid, flexible body, or foam, or enveloped colloid, gas, or liquid, or vacuum structure, for being placed between the piping segments near the first fluid inlet and outlet terminal (101) of the U-type wavy piping (600), which are concentrated adjacent installed at the axial core of the columnar thermal conductive body (300), and the piping segments near the second fluid inlet and outlet terminal (102) of U-type wavy piping (600), or for being substituted by the piping segments near the first fluid inlet and outlet terminal (101) directly made of thermal insulating material or enveloped by thermal insulating material; by way of the above thermal insulating structure, for substantially reducing thermal energy loss caused by thermal conduction between adjacent piping segments of the first fluid inlet and outlet terminal (101) and the second fluid inlet and outlet terminal (102) on the same side of the U-type wavy piping (600).

FIG. 9 is a schematic view of an embodiment, showing that the piping segment of the first fluid inlet and outlet terminal (101) in U-type wavy piping (600) is placed near the center of the columnar thermal conductive body (300), the piping segment between the second fluid inlet and outlet terminal (102) is placed near the periphery of the columnar thermal conductive body (300), and the U-type wavy piping (600) between the two piping segments is wavily arranged along the axial direction and near the edge of the columnar thermal conductive body (300), according to the present invention.

Figure 10:
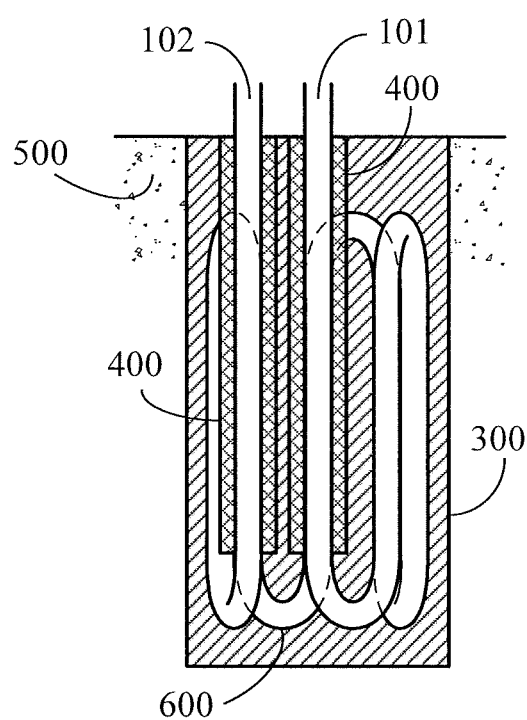
FIG. 10 is a section view of FIG. 9.

FIG. 10 is a section view of FIG. 9.

As shown in FIG. 9 and FIG. 10, the main components are as followings:

U-type wavy piping (600): made of U-type wavy pipe body for the thermal conductive fluid (111) passing through, wherein the U-type wavy piping (600) is used for being installed within the columnar thermal conductive body (300) composed of solid state or colloidal object; the feature is that the U-type wavy piping (600) is wavily placed around the axial direction and near the edge of the columnar thermal conductive body (300) with upper and lower wavy bending, the both ends of the U-type wavy piping (600) have the first fluid inlet and outlet terminal (101) and the second fluid inlet and outlet terminal (102) which are interlinked, in which the piping segment of the first fluid inlet and outlet terminal (101) is placed near the center of the columnar thermal conductive body (300), the piping segment between the second fluid inlet and outlet terminal (102) is placed near periphery of the columnar thermal conductive body (300), and the U-type wavy piping (600) between the two piping segments is wavily arranged along the axial direction and near the edge of the columnar thermal conductive body (300);

Columnar thermal conductive body (300): made of thermal conductive material, wherein the columnar thermal conductive body (300) has columnar structure with various geometric shape sections, such as circle, oval, square, rectangular, or star, for coating the U-type wavy piping (600) and the thermal insulating device (400); and Thermal insulating device (400): related to thermal insulating structure constituted by the followings with thermal insulating effects, such as solid, flexible body, or foam, or enveloped colloid, gas, or liquid, or vacuum structure, for being placed between the piping segments near the first fluid inlet and outlet terminal (101) of the U-type wavy piping (600), which are concentrated adjacent installed at the axial core of the columnar thermal conductive body (300), and the piping segments near the second fluid inlet and outlet terminal (102) of U-type wavy piping (600), or for being substituted by the piping segments near the first fluid inlet and outlet terminal (101) directly made of thermal insulating material or enveloped by thermal insulating material; by way of the above thermal insulating structure, for substantially reducing thermal energy loss caused by thermal conduction between adjacent piping segments of the first fluid inlet and outlet terminal (101) and the second fluid inlet and outlet terminal (102) on the same side of the U-type wavy piping (600).

Figure 11:
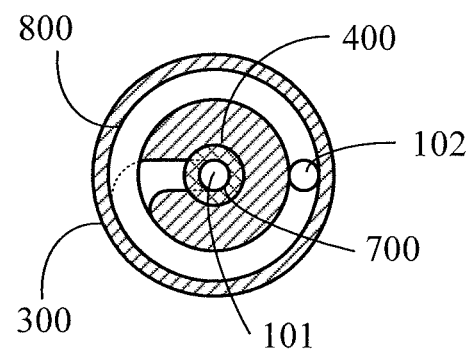
FIG. 11 is a schematic view of an embodiment, showing that the spiral piping segment of the first fluid inlet and outlet terminal (101) and the second fluid inlet and outlet terminal (102) in U-type spiral piping is spirally arranged along the axial direction and near the edge of the columnar thermal conductive body (300), according to the present invention.

FIG. 11 is a schematic view of an embodiment, showing that the spiral piping segment of the first fluid inlet and outlet terminal (101) and the second fluid inlet and outlet terminal (102) in U-type spiral piping is spirally arranged along the axial direction and near the edge of the columnar thermal conductive body (300), according to the present invention.

Figure 12:
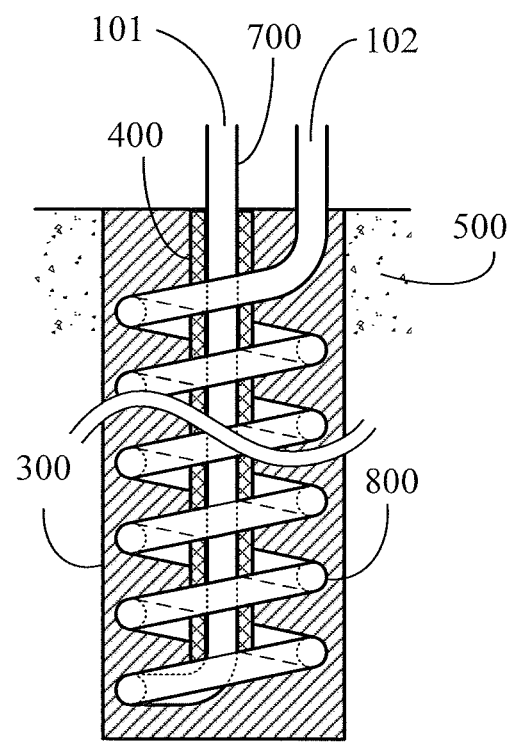
FIG. 12 is a section view of FIG. 11.

FIG. 12 is a section view of FIG. 11.

As shown in FIG. 11 and FIG. 12, the main components are as followings:

U-type spiral piping (800): made of U-type spiral pipe body for the thermal conductive fluid (111) passing through, wherein the U-type spiral piping (800) is used for being installed within the columnar thermal conductive body (300) composed of solid state or colloidal object; the feature is that the U-type spiral piping (800) is spirally placed around the axial direction and near the edge of the columnar thermal conductive body (300), and the both ends of the U-type spiral piping (800) have the first fluid inlet and outlet terminal (101) and the second fluid inlet and outlet terminal (102) which are interlinked, in which the first fluid inlet and outlet terminal (101) placed at the top end of the center of the spiral structure directly leads to the bottom of the U-type spiral piping (800) via the central piping of U-type spiral piping (700), and the second fluid inlet and outlet terminal (102) is placed at the top end of the U-type spiral piping (800) spirally up its own run;

Columnar thermal conductive body (300): made of thermal conductive material, wherein the columnar thermal conductive body (300) has columnar structure with various geometric shape sections, such as circle, oval, square, rectangular, or star, for coating the U-type spiral piping (800) and the thermal insulating device (400); and Thermal insulating device (400): related to thermal insulating structure constituted by the followings with thermal insulating effects, such as solid, flexible body, or foam, or enveloped colloid, gas, or liquid, or vacuum structure, wherein the piping segment of the central piping the U-type spiral piping (700) of the U-type spiral piping (800), which is placed at the axial core of the columnar thermal conductive body (300) and leads up to the first fluid inlet and outlet terminal (101), is directly made of thermal insulating material or enveloped by thermal insulating material, or the thermal insulating device (400) is placed between the U-type spiral piping (800) around and near the edge of the columnar thermal conductive body (300) spirally up its own run leading to the second fluid inlet and outlet terminal (102) and the piping segment of the central piping of U-type spiral piping (700); by way of the above thermal insulating device (400), for substantially reducing thermal energy loss caused by thermal conduction between the central piping of U-type spiral piping (700) installed at the center of the bottom of the same U-type spiral piping (800) leading up to the first fluid inlet and outlet terminal (101), and the U-type spiral piping (800) leading to the second fluid inlet and outlet terminal (102).

I claim:

1. A thermal conductive cylinder for being installed within a thermal storage body (500) composed of a natural thermal storage body, the natural thermal storage body including one of a shallow surface of the earth, a body of water, and artificial objects in a solid, gaseous, or liquid state;

wherein the thermal conductive cylinder is installed with a plurality of U-type piping (100) and constructed so that a thermal insulation is present between a fluid inlet terminal and a fluid outlet terminal of each of the plurality of U-type piping (100) so as to prevent thermal energy loss because of thermal conduction between adjacent U-type piping sections of the inlet terminal and the outlet terminal on a same side when thermal conductive fluid with a temperature difference passes through;

wherein each of the plurality of U-type piping (100) is used for one or more of the following types of thermal conductive fluid (111) passing through, including:
1) liquid state fluid;
2) gaseous state fluid;
3) liquid to gaseous state fluid; and
4) gaseous to liquid state fluid, wherein the U-type piping sections include two or more radially arranged U-type piping sections installed within the thermal conductive cylinder and radially arranged along a radius of the thermal conductive cylinder, such that one of the U-type piping sections is radially outward of another of the U-type piping sections with respect to said radius of the thermal conductive cylinder;

wherein the two or more radially arranged U-type piping sections are discrete from and have interior flowpaths that are not in communication with each other within the thermal conductive cylinder; and wherein the plurality of U-type piping (100) are each made of a U-type tubular body for the thermal conductive fluid (111) to pass through, each of the U-type piping (100) has a separate first fluid inlet and outlet terminal (101) and a separate second fluid inlet and outlet terminal (102), the U-type piping sections near the first fluid inlet and outlet terminal (101) are adjacently installed, and the U-type piping sections near the second fluid inlet and outlet terminal (102) are arranged to be radially outward of the U-type piping sections near the first fluid inlet and outlet terminal (101) and to extend in an axial direction; and wherein the thermal insulation includes a thermal insulating structure (400) made of a thermal insulating material with thermal insulating effects, the thermal insulating structure including one of a solid body, a flexible body, a foam body, and an enveloped colloid, gas, liquid, or vacuum structure, for being placed between the U-type piping sections near the first fluid inlet and outlet terminal (101) of each of the U-type piping (100) and the U-type piping sections near the second fluid inlet and outlet terminal (102) of each of the U-type piping (100); for substantially reducing thermal energy loss caused by thermal conduction between adjacent U-type piping sections of the first fluid inlet and outlet terminal (101) and the second fluid inlet and outlet terminal (102) on the same side of the U-type piping (100).

2. A thermal conductive cylinder as claimed in claim 1, wherein the first fluid inlet and outlet terminal (101) of each of the U-type piping are adjacent each other and sections of said respective U-type piping extending from the first fluid inlet and outlet terminal (101) are surrounded by the thermal insulating structure (400).

* * * * *